United States Patent [19]
Miyagi et al.

[11] Patent Number: 5,850,313
[45] Date of Patent: Dec. 15, 1998

[54] OBJECTIVE LENS DRIVING DEVICE AND A METHOD FOR MANUFACTURING THE SAME

[75] Inventors: Takahiro Miyagi; Shigeru Takaya; Yoshifumi Masunaga, all of Saitama-ken, Japan

[73] Assignee: Pioneer Electronic Corporation, Tokyo, Japan

[21] Appl. No.: 778,455

[22] Filed: Jan. 3, 1997

[30] Foreign Application Priority Data

Jan. 9, 1996 [JP] Japan .................................. 8-018403

[51] Int. Cl.$^6$ ........................................................ G02B 7/02
[52] U.S. Cl. ........................ 359/813; 359/814; 359/824; 369/44.15
[58] Field of Search ...................... 359/813, 814, 359/823, 824; 369/44.15, 44.16

[56] References Cited

U.S. PATENT DOCUMENTS

| | | | |
|---|---|---|---|
| 5,208,703 | 5/1993 | Ikegame et al. | 359/813 |
| 5,467,328 | 11/1995 | Murakami et al. | 359/824 |
| 5,500,771 | 3/1996 | Tomiyama et al. | 359/814 |
| 5,521,762 | 5/1996 | Tomiyama et al. | 359/814 |
| 5,535,059 | 7/1996 | Mitsumori et al. | 359/813 |
| 5,646,789 | 7/1997 | Lee | 359/814 |
| 5,657,172 | 8/1997 | Shibata et al. | 359/824 |

FOREIGN PATENT DOCUMENTS

| | | |
|---|---|---|
| 617 419 A1 | 9/1994 | European Pat. Off. . |
| 650 161 A1 | 4/1995 | European Pat. Off. . |

*Primary Examiner*—Loha Ben
*Attorney, Agent, or Firm*—Naikaido Marmelstein Murray & Oram LLP

[57] ABSTRACT

There is provided an objective lens driving device, wherein a lens holder for holding an objective lens and a coil unit is connected with and floatingly supported by a base block using a plurality of elongate flexible metal members. The objective lens driving device is formed by positioning a plurality of elongate flexible metal members at the predetermined positions with respect to the lens holder and the base block which are to be formed, forming the lens holder integrally connected with one end of each elongate flexible metal member, forming the base block integrally connected with the other end of each elongate flexible metal member, attaching the objective lens and the coil unit in the lens holder.

13 Claims, 8 Drawing Sheets

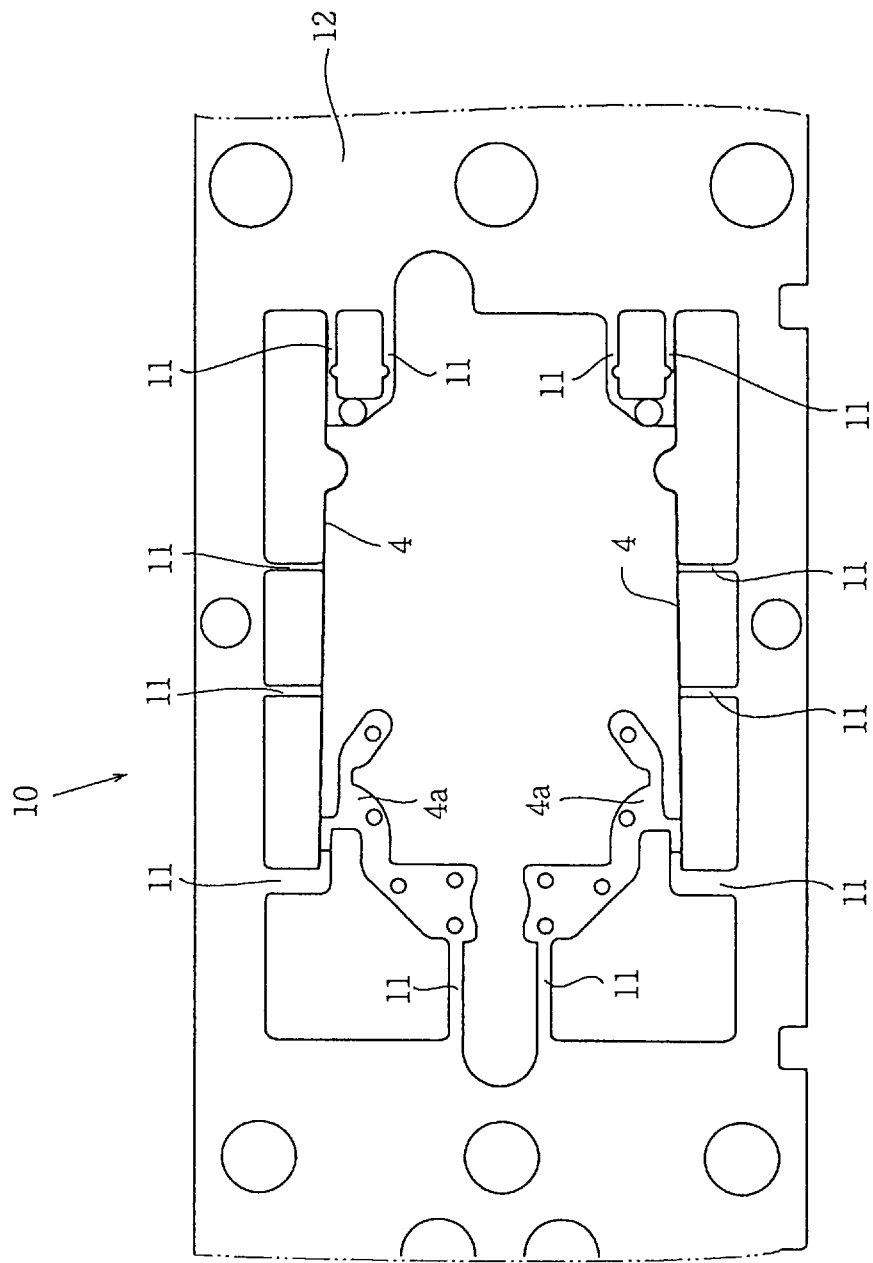

OBJECTIVE LENS DRIVING DEVICE AND A METHOD FOR MANUFACTURING THE SAME

BACKGROUND OF THE INVENTION

The present invention relates to an objective lens driving device, particularly to an objective lens driving device for use in reproducing an information recording medium. This invention also relates to a method for manufacturing such an objective lens driving device.

In order to properly reproduce information recorded on an information recording medium such as an optical disc, an objective lens is required to correctly trace along information tracks formed on the optical disc. For this reason, there have been suggested several kinds of objective lens driving devices capable of electromagnetically driving the objective lens in the focusing direction and the tracking direction so as to cause the objective lens to trace along a correct track all the time during information reproduction.

FIG. 10 is a perspective view showing a kind of conventional objective lens driving device, FIG. 11 is an exploded view showing the objective lens driving device of FIG. 10. As shown in FIGS. 10 and 11, the conventional objective lens driving device comprises a lens holder 101 for holding an objective lens 102, a focusing coil 103 wound around the holder 101, a plurality of tracking coils 104 which are arranged with their central axes orthogonal to that of the focusing coil 103 in a manner such that the tracking coils 104 and the focusing coil 103 are partially overlapped in the horizontal direction.

Referring again to FIG. 10, the lens holder 101 is connected with a base member 106 by virtue of four elongate flexible metal members 105. In this way, the lens holder 101 is movably supported so that it is allowed to slightly move in the focusing and tracking directions.

In fact, magnetic circuits are formed by virtue of a yoke base 107 fixed on one side thereof to the base member 106, a pair of magnets 108, 108 and a pair of yoke members 107a, 107a vertically fixed on the yoke base 107. The pair of yoke members 107a, 107a are provided on the yoke base 107 in a manner such that they may be inserted through a pair of through holes 101a, 101a formed in the lens holder 101 when the lens holder 101 is installed in place on the yoke base 107. In this way, a pair of magnetic gaps are formed, each of which is disposed between a yoke member 107a and a magnet 108, and is adapted to partially receive the focusing coil 103 and the tracking coils 104, so that magnetic flux may pass through the mutually horizontally overlapped portions of the focusing coil 103 and the tracking coils 104. When an electric current is supplied through the focusing coil 103 and the tracking coils 104, driving forces will thus be generated from the mutually horizontally overlapped portions of the focusing coil 103 and the tracking coils 104, so that the lens holder 101 may be properly driven in the focusing and tracking directions.

In a process for assembling the conventional objective lens driving device shown in FIGS. 10 and 11, at first, the focusing coil 103 is wound around the lens holder 101 firmly holding an objective lens 102, then a plurality of tracking coils 104 are fixedly installed in predetermined positions as shown in FIGS. 10 and 11. Subsequently, the lens holder 101 firmly holding the lens 102 is disposed on the yoke base 107, such that the yoke members 107a, 107a are inserted in the pair of through holes 101a, 101a formed in the lens holder 101. Afterwards, some special tools have to be used to fix, at predetermined positions of the magnetic gaps, the mutually horizontally overlapped portions of the focusing coil 103 and the tracking coils 104. Finally, the lens holder 101 is connected to the base member 106 by virtue of four elongate flexible metal members 105 in a manner such that the lens holder 101 is floatingly supported thereon and is allowed to slightly move in the focusing and tracking directions.

However, since the elongate flexible metal members 105 are in a fine and thin state, it is required that the four elongate metal members 105 be arranged and attached in predetermined positions with a high precision during the above process of assembling the objective lens driving device. If such elongate flexible metal members 105 are not exactly arranged and attached in their predetermined geometrically symmetrical positions, it will be difficult for the lens holder 101 to be supported in a predetermined correct position with respect to the magnetic gaps. As a result, it will be difficult to ensure a desired driving force for the lens holder 101, undesirably causing an operation unstability of the objective lens driving device.

Further, since the elongate flexible metal members 105 are in a fine and thin state, they are liable to be injured during the process of assembling the objective lens driving device. Even if, as an assembling operation error, only one of the four elongate flexible metal members is injured, the lens holder 101 as a whole will be difficult to be supported with a predetermined sufficient strength. As a result, it is difficult to ensure a desired operation stability of the objective lens driving device.

Moreover, since some complex processes are involved in assembling the objective lens driving device shown in FIGS. 10 and 11, the production cost has always been high. In addition, since some complex processes are involved in assembling a conventional objective lens driving device, it is difficult to have the whole assembling operation improved by introducing automation technique.

SUMMARY OF THE INVENTION

An object of the present invention is to provide an improved objective lens driving device for use in reproducing an information recording medium, so as to solve the above-mentioned problems peculiar to the above-mentioned prior art.

Another object of the present invention is to provide a method for manufacturing the improved objective lens driving device.

According to the present invention, there is provided an objective lens driving device, wherein a lens holder for holding an objective lens and a coil unit is connected with and floatingly supported by a base block using a plurality of elongate flexible metal members, characterized in that: the objective lens driving device is formed by positioning a plurality of elongate flexible metal members at the predetermined positions with respect to the lens holder and the base block which are to be formed, forming the lens holder integrally connected with one end of each elongate flexible metal member, forming the base block integrally connected with the other end of each elongate flexible metal member, attaching the objective lens and the coil unit in the lens holder.

Further, according to the present invention, there is provided an objective lens driving device, wherein a lens holder for holding an objective lens and a coil unit is connected with and floatingly supported by a base block using a plurality of elongate flexible metal members, characterized in that: the objective lens driving device is formed by (a)

preparing two suspension frames, each suspension frame including a frame structure, two elongate flexible metal members, connecting portions for connecting the frame structure with the two elongate flexible metal members; (b) positioning the two suspension frames in a mutually parallel relationship with each other and positioning a plurality of elongate flexible metal members at the predetermined positions with respect to the lens holder and base block which are to be formed; (c) forming the lens holder integrally connected with one end of each elongate flexible metal member; (d) forming the base block integrally connected with the other end of each elongate flexible metal member; (e) attaching the objective lens and the coil unit to the lens holder; and (f) connecting the base block with an actuator base of the lens driving device. Here, the lens holder is formed with a first hole for receiving the objective lens and a second hole for receiving the coil unit, both of the first and second holes have their openings arranged such that the objective lens and the coil unit are allowed to be attached to the respective holes with a movement in a direction perpendicular to the length of the plurality of elongate flexible metal members.

In addition, the objective lens driving device according to the present invention may also be formed by (a) providing, at one end of each elongate flexible metal member, an electric feeder portion for connecting with a terminal of the coil unit; (b) positioning each electric feeder portion in the second hole; (c) attaching the coil unit in the second hole to render each terminal of the coil unit in contact with a corresponding electric feeder portion; and (d) connecting each terminal of the coil unit with a corresponding electric feeder portion by means of solderring.

In the foregoing objective lens driving devices, the actuator base contains a magnetic circuit producing magnetic flux to the coil unit.

Further, according to the present invention, there is provided an objective lens driving device, wherein a lens holder for holding an objective lens and a coil unit is connected with and floatingly supported by a base block using a plurality of elongate flexible metal members, an electric current is supplied to the coil through the plurality of elongate flexible metal members, characterized in that: each of the elongate flexible metal member has a connecting portion for connecting with the coil unit, the lens holder has a lens receiving portion and a coil unit receiving portion and is integrally formed with the respective ends of the elongate flexible metal members, the above connecting portions of the respective elongate flexible metal members are positioned to be exposed near the coil unit in the lens holder. Here, each elongate flexible metal member has a terminal positioned near the base block for connecting with a connecting portion for supplying electric current to the driving coil unit, each of the terminals is exposed on the base block which is integrally formed with the elongate flexible metal members.

Further, according to the present invention, there is provided a method of manufacturing an objective lens driving device which includes a lens holder for holding an objective lens and a coil unit, a base block connected with and floatingly supporting the lens holder through a plurality of elongate flexible metal members, The method comprises the steps of: positioning a plurality of elongate flexible metal members at the predetermined positions with respect to the lens holder and base block which are to be formed; forming the lens holder integrally connected with one end of each elongate flexible metal member; forming the base block integrally connected with the other end of each elongate flexible metal member; and attaching the objective lens and the coil unit in the lens holder.

Further, according to the present invention, there is provided a method of manufacturing an objective lens driving device, the device including a lens holder for holding an objective lens and a coil unit, a base block connected with and floatingly supporting the lens holder through a plurality of elongate flexible metal members. The method comprises the steps of: preparing suspension frames each including a frame structure, two elongate flexible metal members, connecting portions for connecting the frame structure with the two elongate flexible metal members; positioning two of the suspension frames in a mutually parallel relationship with each other and positioning four elongate flexible metal members at the predetermined positions with respect to the lens holder and the base block which are to be formed; forming the lens holder integrally connected with one end of each elongate flexible metal member; forming the base block integrally connected with the other end of each elongate flexible metal member;attaching the objective lens and the coil unit in the lens holder; and connecting the base block with an actuator base of the objective lens driving device. Here, the lens holder is formed with a first hole for receiving the objective lens and a second hole for receiving the coil unit, both of the first and second holes have their openings arranged such that the objective lens and the coil unit are allowed to be attached to the respective holes with a movement in a direction perpendicular to the length of the plurality of elongate flexible metal members. The method further includes: providing, at one end of each elongate flexible metal member, an electric feeder portion for connecting with a terminal of the coil unit; positioning each electric feeder portion in the above second hole; attaching the coil unit in the above second hole to render each terminal of the coil unit in contact with a corresponding electric feeder portion; connecting each terminal of the coil unit with a corresponding electric feeder portion by means of solderring.

The above objects and features of the present invention will become more understood from the following description with reference to the accompanying drawings.

BRIEF DESCRIPTION OF DRAWINGS

FIG. 1b is a side view of the objective lens driving device shown in FIG. 1a.

FIG. 4 is a plane view showing a suspension frame for use in the objective lens driving device according to the present invention.

DETAILED DESCRIPTION OF THE PREFERRED EMBODIMENTS

Figure 1A:
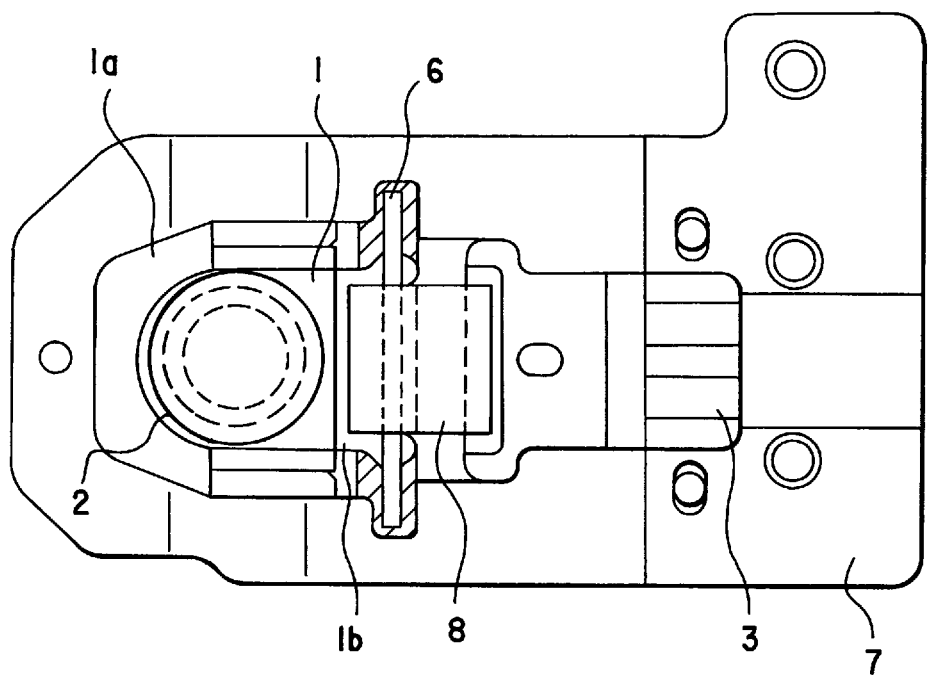
FIG. 1a is a plane view showing an objective lens driving device according to the present invention.
Figure 1B:
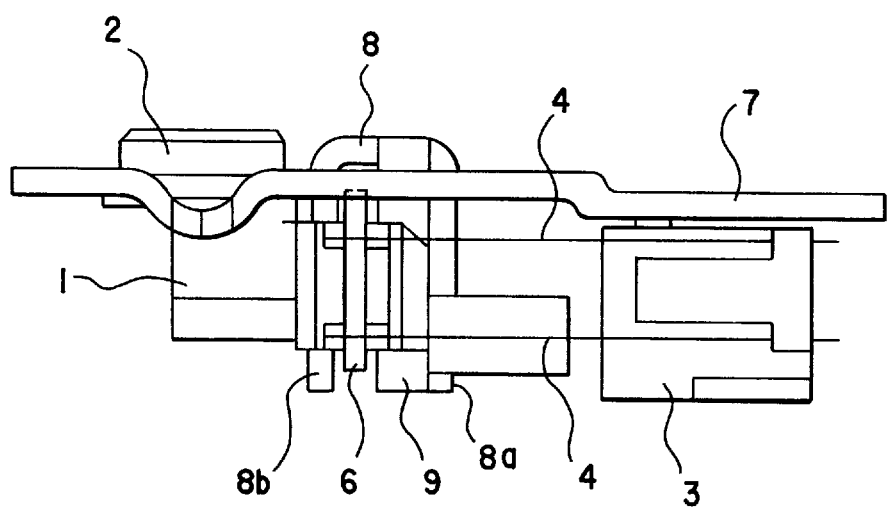

Referring to FIGS. 1a, 1b, 3a and 3b, an objective lens driving device of the present invention has a lens holder 1 which firmly holds an objective lens 2 and has a through hole 1b formed in the lens holder 1. The lens holder 1 is connected to a base block 3 by virtue of four elongate flexible metal members 4. The base block 3 itself is fixed on an actuator base 7 which in turn is secured on a pickup body (not shown) containing a laser beam source and several optical elements for directing the laser beam through the objective lens 2. In this manner, the lens holder 1 holding the objective lens 2 is floatingly supported by the four elongate flexible metal members 4, so that the lens holder, 1 is floatingly movable with respect to the pickup body.

The actuator base 7 is positioned closer to an optical disc (not shown) than the lens holder 1. The lens holder 1 is formed with a hole la capable of receiving the objective lens 2 in a manner such that the lens 2 will project towards the optical disc (not shown).

A coil unit 6 has been formed to have a plate-like shape, and is fixed in the hole 1b of the lens holder 1. A U-shaped yoke unit 8 (FIG. 1b) having a pair of mutually facing elements (8a, 8b) is secured on the actuator base 7. One element 8a is holding and in contact with a magnet 9, so that a magnetic circuit is formed passing through the hole 1b by virtue of the yoke member 8 and the magnet 9. Thus, the coil unit 6 may be disposed in a magnetic gap formed between the yoke element 8b and the magnet 9.

Alternatively, the yoke unit 8 may also be formed integrally with the actuator base 7. If so, it is necessary that the actuator base 7 be made of a magnetic material.

Figure 2:
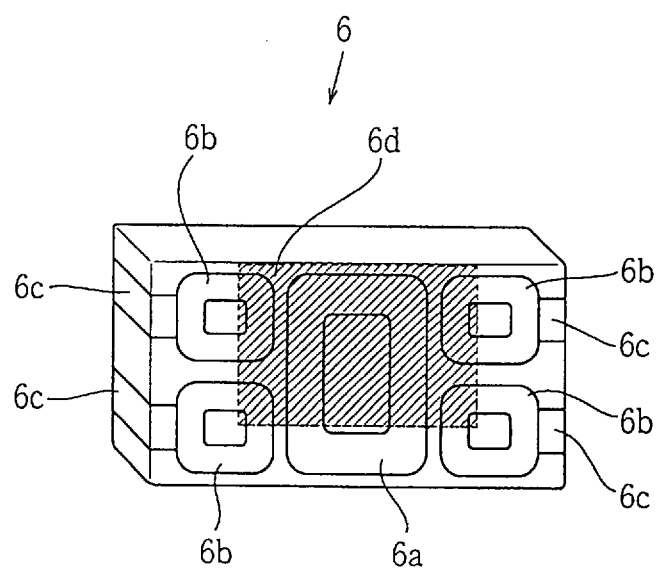
FIG. 2 is a perspective view showing in detail a coil unit for use in the objective lens driving device according to the present invention.

FIG. 2 is a detailed illustrative view indicating the coil unit 6. As illustrated in FIG. 2, the coil unit 6 includes a focusing coil 6a positioned in the center thereof, and four tracking coils 6b positioned at four corners thereof. The four tracking coils 6b are connected in series with one another through a connecting wire (not shown). Each tracking coil 6b is provided with a terminal 6c which is connected with one of the four elongate flexible metal members 4 through connecting portion 4a (to be described later). In this manner, an electric current may be supplied to the focusing coil 6a and the four tracking coils 6b through the four terminals 6c, In fact, two of the terminals 6c are connected to two opposite ends of the focusing coil 6a, the remaining two terminal 6c are connected to two opposite ends of the four tracking coils 6b which are connected in series with one another. In FIG. 2, a shade portion 6d is a portion that will be placed in the magnetic gap of the above-mentioned magnetic circuit, In this way, with the use of Fleming's left-hand rule, it is possible for the coil unit 6 to produce driving forces in desired directions (focusing direction and tracking direction).

Figure 3A:
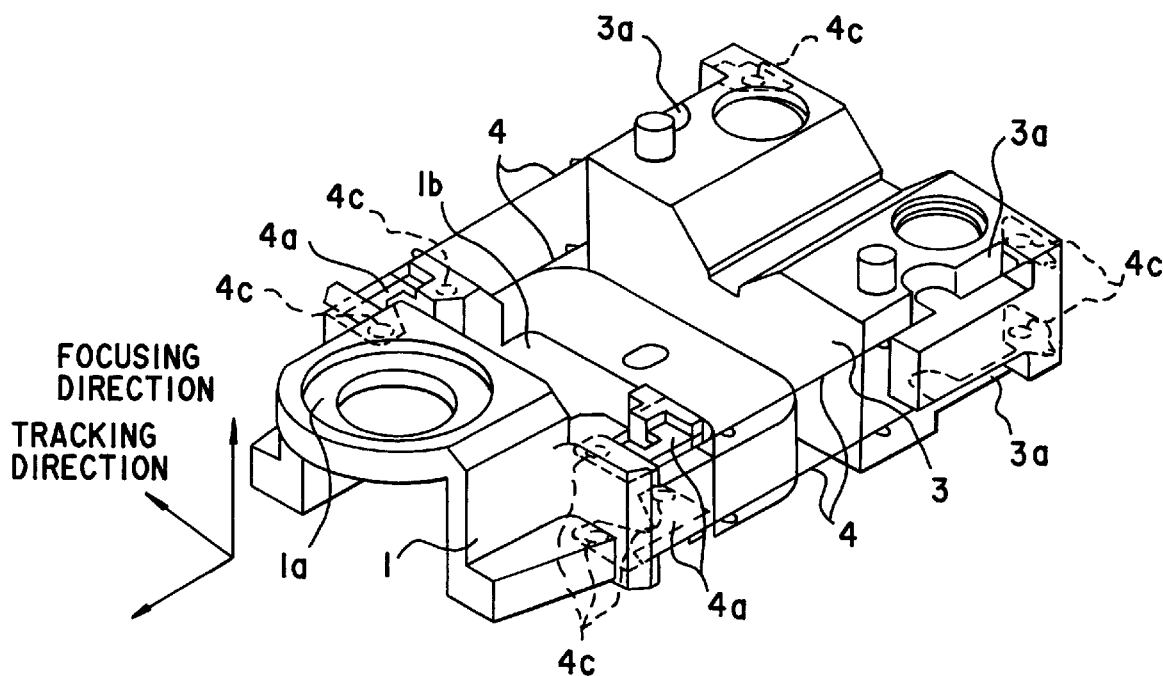
FIGS. 3a and 3b are perspective views indicating that a lens holder and a base block of the driving device are connected with each other by virtue of four elongate flexible metal members.
Figure 3B:
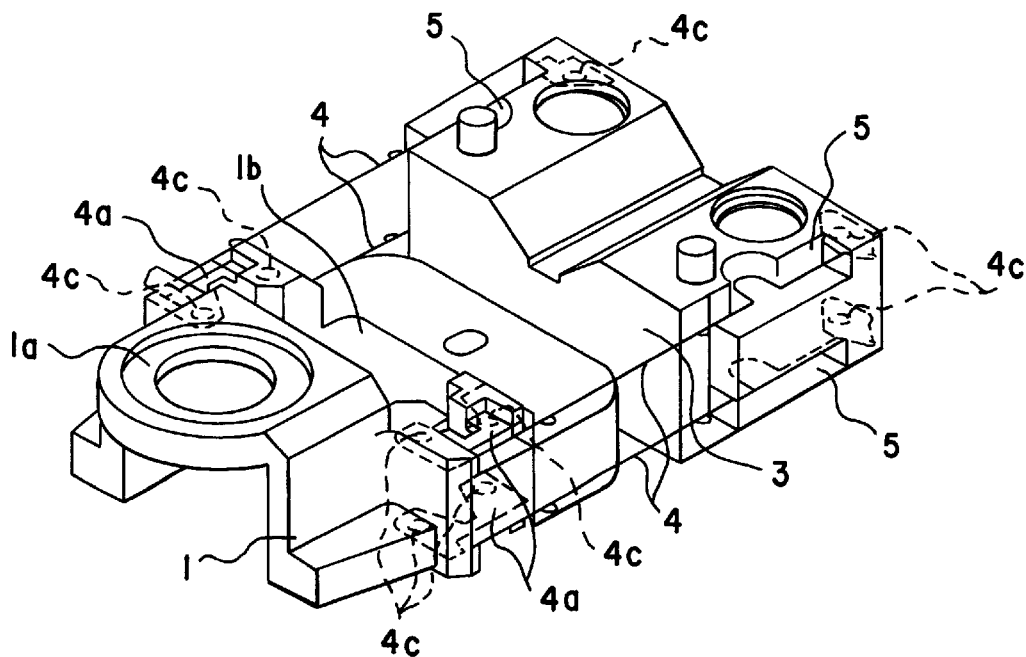

Referring to FIGS. 3a and 3b, the lens holder 1 and base block 3 are all made of resin, and are all integrally formed with the four elongate flexible metal members 4. As shown in FIGS. 3a and 3b, the end portions of each elongate flexible metal member 4 is fixedly buried into the lens holder 1 and the base block 3. With the use of such a structure, it can be expected that the rigidity of both the lens holder 1 and the base blocks 3 may be improved and that the four elongate flexible metal members 4 may be correctly fixed with a high precision on both the lens holder 1 and the base block 3. Further, each of the lens holder 1 and the base block 3 is formed therein with several holes 4c that are used to receive the end portions of the four elongate flexible metal members 4. In this way, since a contacting/combining area between each elongate flexible metal member 4 and the lens holder 1 and a contacting/combining area between each elongate flexible metal member 4 and the base block 3 have been become larger than prior art, each elongate flexible metal members 4 may be more firmly fixed on the lens holder 1 and the base block 3.

The lens holder 1 is formed with a hole la for receiving and positioning the objective lens 2. Close to the hole 1b of the lens holder 1, two connecting portions 4a, 4a (each is in a cutout form and connected with two elongate flexible metal members) are formed to be exposed. Once the coil unit 6 is attached to and fixed at a predetermined position in the hole 1b, the two connecting portions 4a, 4a will get in contact with all the terminals 6c. Therefore, the four elongate flexible metal members 4 can be easily made electrically contact with the focusing coil 6a and the tracking coils 6b, simply by attaching and fixing the coil unit 6 at a predetermined position in the hole 1b.

As shown in FIG. 3b, the four elongate flexible metal members 4 are exposed from the surface of the base block 3. Each of the elongate flexible metal members 4 has a connecting terminal (not shown) which is connected with one end of an electric feeder wire (not shown). The other end of the electric feed wire (not shown) is connected to a current generating circuit for generating a driving current to be supplied to the coil unit 6. Namely, the driving current generated from the current generating circuit may be supplied to the focusing coil 6a and the tracing coils 6b through the elongate flexible metal members 4.

As shown in FIG. 3a, the base block 3 has, on the four corners thereof, four recess portions 3a. In fixing the four elongate flexible metal members 4 to the base block 3, at first, one end of each elongate flexible metal member 4 is disposed in each recess portion 3a, then an adhesive/resilient member 5 (FIG. 3b) is used to fill up the recess potion 3a, so that one end of the elongate flexible metal member 4 is firmly buried in the recess portion 3a. Here, the adhesive/resilient member 5 is made of a material that is selected so that it is useful to prevent a resonance phenomenon of a certain frequency which is otherwise caused when the lens holder 1 is being driven. Substantially, the adhesive/resilient member 5 should be made of a material capable of converting resonance energy into heat energy. For instance, an engineering plastic such as an elastomer plastic may be used as a material to form the adhesive/resilient member 5.

A method for manufacturing the above objective lens driving device will be described in detail with reference to FIGS. 4–8.

FIG. 4 shows a suspension frame 10 in which two elongate flexible metal members 4 are connected with a frame member 12 by means of a plurality of connecting portions 11. In fact, the two elongate flexible metal members 4, 4 are arranged in a manner which is the same as shown in FIG. 3a. By the way, the frame member 12 for making the suspension frame 10 may be formed by removing therefrom unnecessary portions of a flat metal plate.

Figure 5:
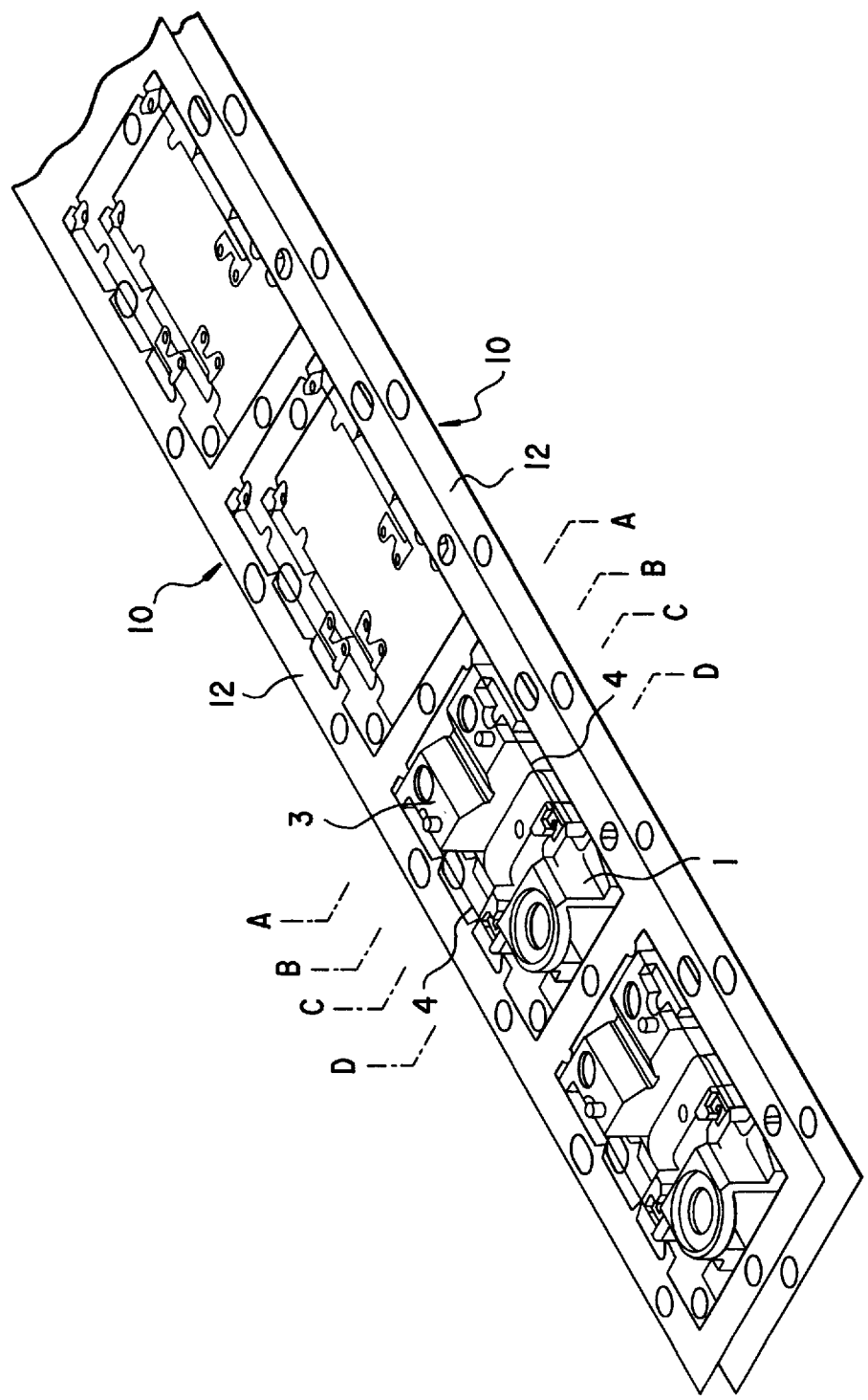
FIG. 5 is a perspective view indicating that suspension frames are integrally formed with lens holders and base blocks to form objective lens driving devices of the present invention.
Figure 6:
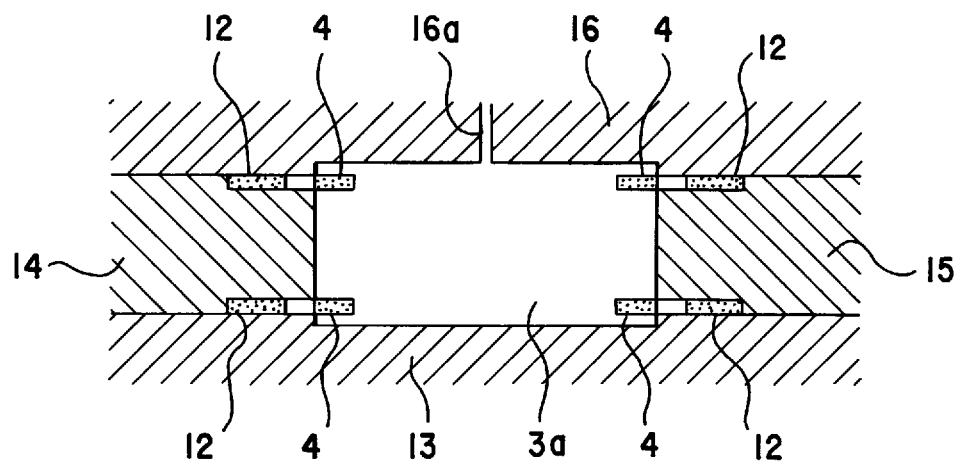
FIG. 6 is a cross sectional view taken along A—A line in FIG. 5, showing a metal mould in which a suspension frame may be integral formed with a lens holder and a base block.
Figure 7:
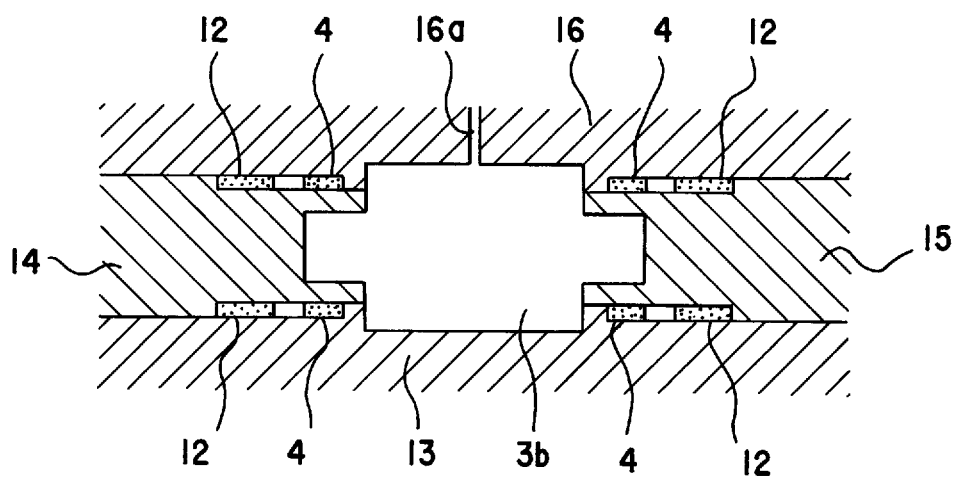
FIG. 7 is a cross sectional view taken along B—B line in FIG. 5, showing a metal mould in which a suspension frame may be integrally formed with a lens holder and a base block.
Figure 8:
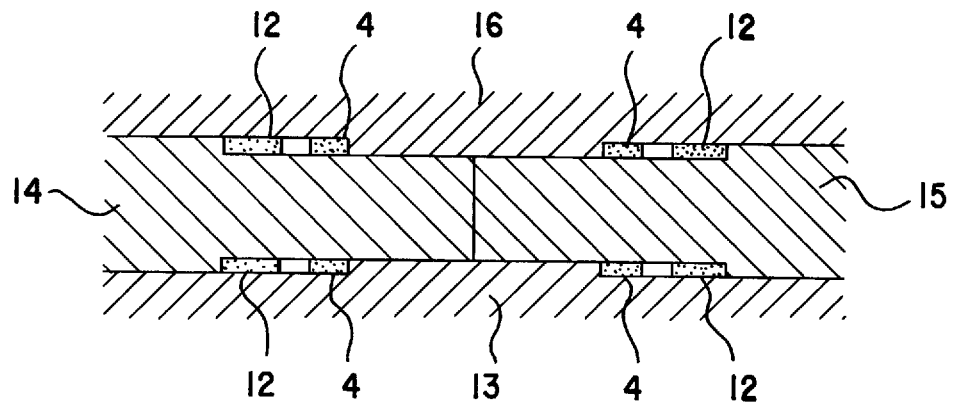
FIG. 8 is a cross sectional view taken along C—C line in FIG. 5, showing a metal mould in which a suspension frame may be integrally formed with a lens holder and a base block.
Figure 9:
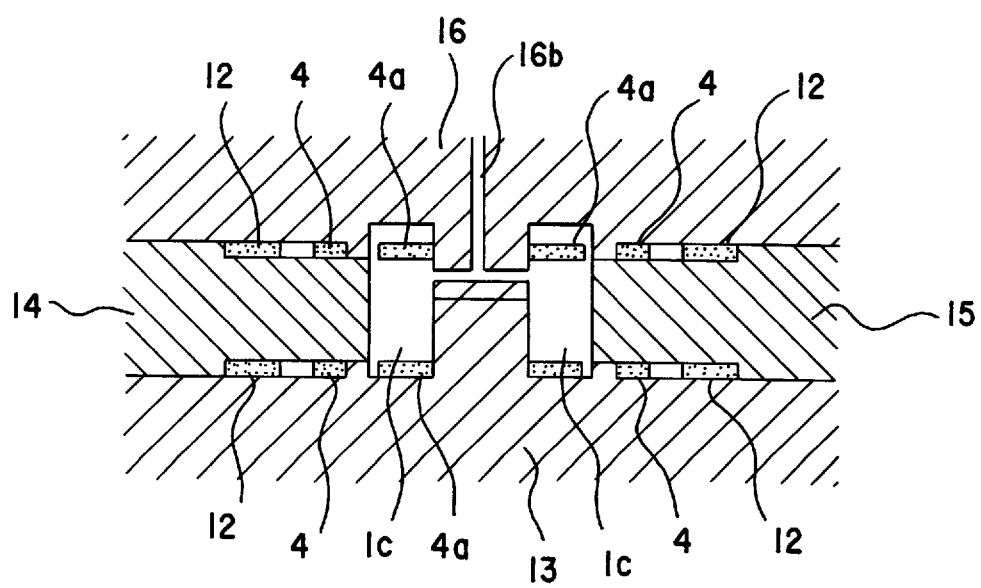
FIG. 9 is a cross sectional view taken along D—D line in FIG. 5, showing a metal mould in which a suspension frame may be integrally formed with a lens holder and a base block.

In the process of forming the lens holder 1 and the base block 3, two pieces of the suspension frames 10 are respectively positioned at upper and lower positions in parallel with each other in a metal mould. As shown in FIGS. 6–9, such a metal mould includes a fixed lower portion 13, a left movable portion 14 and a right movable portion 15, and an upper movable portion 16. In FIGS. 6–9, reference numeral 16a represents a passage way for introducing an amount of resin into a space 3b for the formation of the base block 3, reference numeral 16b represents a passage way for introducing an amount of resin into a space 1c for the formation of the lens holder 1. However, a condition where each lens holder 1 and each base block 3 have been formed integrally with the four elongate flexible metal members 4, is shown in FIG. 5. In detail, FIG. 6 is a cross sectional view taken along line A—A in FIG. 5, FIG. 7 is a cross sectional view taken along line B—B in FIG. 5, FIG. 8 is a cross sectional view taken along line C—C in FIG. 5, FIG. 9 is a cross sectional view taken along line D—D in FIG. 5.

A process for integral formation of the lens holder 1 and base block 3 with the four elongate flexible metal members 4, will be described in detail below.

At first, a first suspension frame 10 is disposed at a predetermined position of the lower fixed portion 13 of the metal mould. Then, a left movable portion 14 and the right movable portion 15 of the metal mould are placed on the first suspension frame 10, and a second suspension frame 10 is disposed at a predetermined position over the left movable portion 14 and the right movable portion 15 of the metal mould. Finally, the upper movable portion 16 of the metal mould is placed on the second suspension frame 10. In this way, the two suspension frames 10, 10 have been received into the metal mould, the four elongate flexible metal members 4 are arranged in a manner which is the same as shown in FIG. 3a.

Subsequently, an amount of resin and another amount of resin are introduced into the space 3b and space 1c respectively through passage ways 16a and 16b. After the resins in the space 3b and 1c have been hardened, the lens holder 1 and the base block 3 are thus formed and completed. Finally, the left movable portion 14 of the metal mould is slidden leftwardly, and the right movable portion 15 of the metal mould is slidden rightwardly, the metal mould can thus be dissembled.

Since the lens holder 1 and the base block 3 are integrally formed with the four elongate flexible metal members 4 by fixing in advance the four elongate flexible metal members 4 in the frame structure 12, it is not necessary to individually fix the four elongate flexible metal members 4 on to the lens holder 1 and the base block 3. Therefore, it is able to avoid any possible injury or damage to the four elongate flexible metal members 4 during the manufacturing of an objective lens driving device, thus simplifying the manufacturing process and improving the connection strength of the four elongate flexible metal members 4 with the lens holder 1 and the base block 3.

Figure 10:
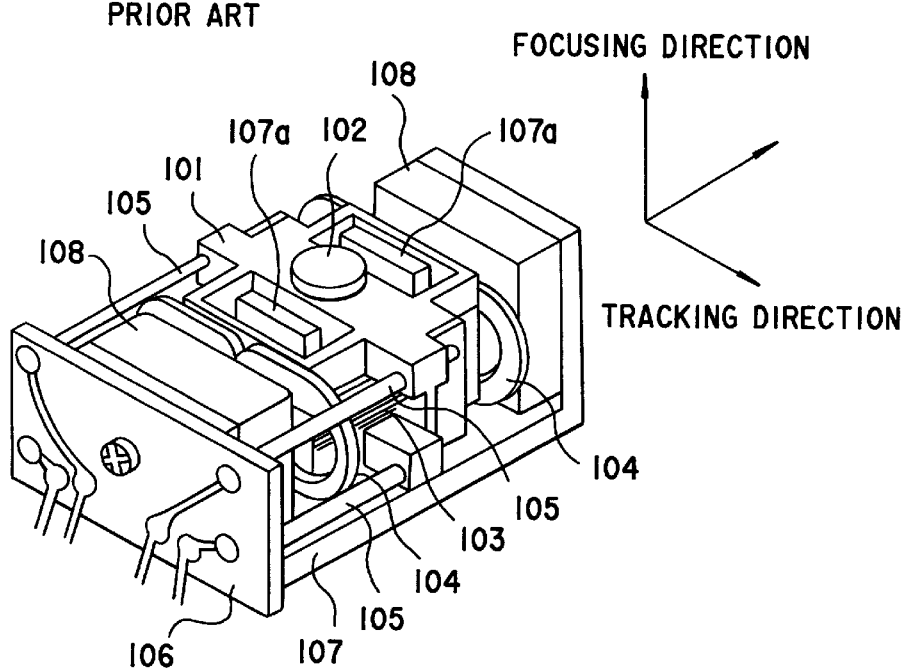
FIG. 10 is perspective view showing a kind of conventional objective lens driving device.
Figure 11:
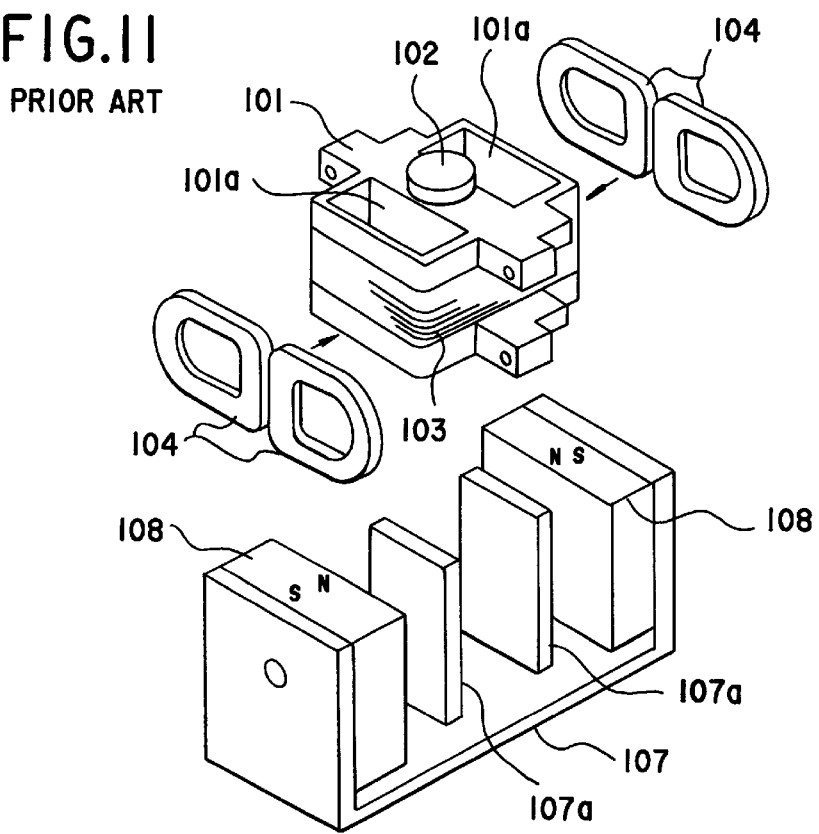
FIG. 11 is an exploded view showing the objective lens driving device of FIG. 10.

After the lens holder 1 and the base block 3 have been formed integrally with the four elongate flexible metal members 4 as shown in FIG. 5, the objective lens 2 is attached in the hole 1a of the lens holder 1, the coil unit 6 is fixed in the hole 1b of the lens holder 1, and the four adhesive/resilient members 5 are forced into the four recess portions 3a. In detail, the coil unit 6 is inserted downwardly from above into the hole 1b in a manner such that it can get in contact with connecting portions 4a. Meanwhile, the connecting terminals 6c of the coil unit 6 are caused to engage with the connecting portions 4a, thus completing the attachment of the coil unit 6 in the lens holder 1. With the use of such a structure, it is understood that focusing coil 6a and tracking coils 6b may be attached to a lens driving device in a greatly simplified manner as compared with the prior art shown in FIGS. 10 and 11.

Afterwards, all of the connecting portions 11 are cut off so as to be removed from the frame member 12, the base block 3 is fixed onto the actuator base 7 holding a magnetic circuit formed in advance. Finally, the actuator base 7, holding the lens holder 1 (including the objective lens 2) and the base block 3, is fixed on to the pickup body (not shown).

With the use of the present invention, as shown in FIG. 3a, it is allowed to attach the objective lens 3 and the coil unit 6 on to the lens holder 1, to connect the respective terminals 6c of the coil unit 6 with the corresponding connecting portions 4a, and to attach the actuator base 7 onto the base block 3, all in a manner from above downwardly towards their respective predetermined positions. Therefore, the process for the manufacturing of an objective lens driving device has been made easier than prior art, permitting an automation for the whole manufacturing process.

When an automation is realized in manufacturing a kind of objective lens driving device as described above, it is possible for an elongate metal sheet to be continuously formed into several suspension frames 10 which are then fed into predetermined positions as shown in FIG. 5.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An objective lens driving device comprising:
    a base block;
    a plurality of elongate flexible metal members;
    a lens holder for holding an objective lens and a coil unit, said lens holder connected with and floatingly supported by said base block using said plurality of elongate flexible metal members;
    said plurality of elongate flexible metal members secured at predetermined connecting positions on the lens holder and the base blocks,
    the lens holder being integrally connected with one end of each elongate flexible metal member, and
    the base block being integrally connected with the other end of each elongate flexible metal member,
    wherein one portion of each elongate flexible metal member is buried inside the lens holder and the base block.

2. An objective lens driving device comprising:
    a base block;
    a plurality of elongate flexible metal members;
    a lens holder for holding an objective lens and a coil unit, said lens holder connected with and floatingly supported by said base block using said plurality of elongate flexible metal members;
    said plurality of elongate flexible metal members secured at predetermined connecting positions on the lens holder and base block;

the lens holder being integrally connected with one end of each elongate flexible metal member;

the base block integrally connected with the other end of each elongate flexible metal member;

the objective lens and the coil unit attached to the lens holder; and the base block connected with an actuator base of the objective lens driving device, wherein each elongate flexible metal member is partially buried inside the lens holder and base block.

3. An objective lens driving device according to claim 2, wherein the lens holder is formed with a first hole for receiving the objective lens and a second hole for receiving the coil unit, both of the first and second holes have their openings arranged such that the objective lens and the coil unit are allowed to be attached to the respective holes with a movement in a direction perpendicular to the length of the plurality of elongate flexible metal members.

4. An objective lens driving device according to claim 3, wherein said device is formed by (a) providing, at one end of each elongate flexible metal member, an electric feeder portion for connecting with a terminal of the coil unit; (b) positioning each electric feeder portion in the second hole; (c) attaching the coil unit in the second hole to render each terminal of the coil unit in contact with a corresponding electric feeder portion; (d) connecting each terminal of the coil unit with a corresponding electric feeder portion by means of soldering.

5. An objective lens driving device according to any one of clams 2–4, wherein the actuator base contains a magnetic circuit producing magnetic flux to the coil unit.

6. An objective lens driving device comprising:

a base block;

a plurality of elongate flexible metal members;

a lens holder for holding an objective lens and a coil unit, said lens holder connected with and floatingly supported by said base block using said plurality of elongate flexible metal members, an electric current is supplied to the coil unit through the plurality of elongate flexible metal members;

wherein each of the elongate flexible metal member has a connecting portion for connecting with the coil unit, the lens holder has a lens receiving portion and a coil unit receiving portion and is integrally formed with the respective ends of the elongate flexible metal members, the connecting portions of the respective elongate flexible metal members are positioned to be exposed near the coil unit in the lens holder, and wherein each elongate flexible metal member is partially buried inside the lens holder and base block.

7. An objective lens driving device according to claim 6, wherein each elongate flexible metal member has a terminal positioned near the base block for connecting with a connecting portion for supplying electric current to the driving coil unit, each of the terminals is exposed on the base block which is integrally formed with the elongate flexible metal members.

8. A method of manufacturing an objective lens driving device, the device including a lens holder for holding an objective lens and a coil unit, a base block connected with and floatingly supporting the lens holder through a plurality of elongate flexible metal members, said method comprising the steps of:

positioning a plurality of elongate flexible metal members at predetermined positions with respect to the lens holder and base block;

integrally connecting the lens holder with one end of each elongate flexible metal member;

integrally connecting the base block with the other end of each elongate flexible metal member;

attaching the objective lens and the coil unit in the lens holder; and partially burying each elongated flexible member inside the lens holder and the base block.

9. A method of manufacturing an objective lens driving device, the device including a lens holder for holding an objective lens and a driving coil unit, a base block connected with and floatingly supporting the lens holder through a plurality of elongate flexible metal members, said method comprising the steps of:

preparing suspension frames each including a frame structure, two elongate flexible metal members, connecting portions for connecting the frame structure with the two elongate flexible metal members;

positioning two of the suspension frames in a mutually parallel relationship with each other and positioning four elongate flexible metal members at predetermined positions with respect to the lens holder and the base block which are to be formed;

forming the lens holder integrally connected with one end of each elongate flexible metal member;

forming the base block integrally connected with the other end of each elongate flexible metal member; and attaching the objective lens and the coil unit in the lens holder; and connecting the base block with an actuator base of the objective lens driving device.

10. A method according to claim 9, wherein the lens holder is formed with a first hole for receiving the objective lens and a second hole for receiving the coil unit, both of the first and second holes have their openings arranged such that the objective lens and the coil unit are allowed to be attached to the respective holes with a movement in a direction perpendicular to the length of the plurality of elongate flexible metal members.

11. A method according to claim 10, further comprising:

providing, at one end of each elongate flexible metal member, an electric feeder portion for connecting with a terminal of the coil unit;

positioning each electric feeder portion in the above second hole;

attaching the coil unit in the above second hole to render each terminal of the coil unit in contact with a corresponding electric feeder portion;

connecting each terminal of the coil unit with a corresponding electric feeder portion by means of soldering.

12. A method according to any one of claims 9–11, wherein the actuator base contains a magnetic circuit producing magnetic flux to the coil unit.

13. An objective lens driving device, comprising:

a base block;

a plurality of elongate flexible metal members;

a lens holder holding an objective lens and a coil unit, said lens holder being connected with and floatingly supported by said base block using said plurality of elongate metal members;

said plurality of elongate flexible metal members being secured at predetermined connecting positions on the lens holder and the base block;

the lens holder being integrally connected with one end of each elongate flexible metal member;

the base block being integrally connected with the other end of each elongate flexible metal member;

wherein the coil unit includes a focusing coil positioned at the center thereof, and further includes four tracking coils positioned at the four corners thereof, the four tracking coils being connected in series with one another through a connecting wire.

* * * * *